US010358694B2

(12) United States Patent
Nakano et al.

(10) Patent No.: US 10,358,694 B2
(45) Date of Patent: Jul. 23, 2019

(54) SYSTEM AND METHOD FOR CONCENTRATING RARE EARTH ELEMENTS FROM COAL BYPRODUCTS/SLAG

(71) Applicant: United States Department of Energy, Washington, DC (US)

(72) Inventors: Jinichiro Nakano, Albany, OR (US); Anna Nakano, Albany, OR (US); James P Bennett, Salem, OR (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/790,636

(22) Filed: Oct. 23, 2017

(65) Prior Publication Data
US 2019/0119785 A1   Apr. 25, 2019

(51) Int. Cl.
| | | |
|---|---|---|
| *C22B 59/00* | (2006.01) | |
| *C22B 7/04* | (2006.01) | |
| *C01B 25/36* | (2006.01) | |
| *B01J 19/00* | (2006.01) | |
| *C22B 9/10* | (2006.01) | |

(52) U.S. Cl.
CPC .......... *C22B 59/00* (2013.01); *B01J 19/0013* (2013.01); *C01B 25/36* (2013.01); *C22B 7/04* (2013.01); *C22B 9/10* (2013.01); *B01J 2219/00051* (2013.01)

(58) Field of Classification Search
CPC ......... C01F 17/00; C22B 1/005; C22B 7/003; C22B 59/00

USPC ................. 423/21.1, 263, DIG. 12
See application file for complete search history.

(56) References Cited

U.S. PATENT DOCUMENTS 5,174,811 A * 12/1992 Schmidt ............... C22B 9/18
75/581
2014/0090518 A1* 4/2014 Stumpf ............... C22B 5/10
75/631

FOREIGN PATENT DOCUMENTS

WO    2017/122556    * 5/2017

* cited by examiner

*Primary Examiner* — Steven J Bos
(74) *Attorney, Agent, or Firm* — Timothy L. Harney; Michael J. Dobbs; Brian J. Lally

(57) ABSTRACT

The disclosure relates to a method for concentrating rare earth elements (REEs) from a coal byproduct. The method includes mixing the coal byproduct input with aluminum phosphate, sulfur and/or other compounds used as an additive; heating the coal byproduct input in air for a period of 3 minutes or longer at a temperature above a liquid starting temperature of the coal byproduct input, forming a molten coal byproduct; cooling the molten coal byproduct at a rate slower than critical glass transition cooling rate of the melt, forming REE phosphate product; heating the coal byproduct input above the liquid starting temperature of the coal byproduct after REE phosphate product is formed; and cooling the coal byproduct input at a rate faster than the critical glass transition cooling rate of the melt, minimizing forming unwanted solids.

10 Claims, 13 Drawing Sheets

Step 1: coal byproduct (input) is mixed with aluminum phosphate (fluxing agent) – AlPO$_4$

Step 2: The aluminum phosphate (fluxing agent) addition in step 1 must satisfy conditions 1 and/or 2

Condition 1 (must)

$$N(P_{fluxing\ agent}) + N(P_{input}) \geq N(REE_{product})$$

N is the number of moles and P is phosphorus.

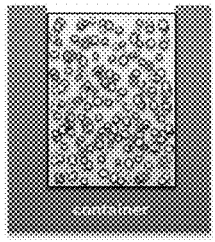

coal byproduct (input) + AlPO$_4$ (fluxing agent)

Condition 2 (optional)

$$C(Al_{input+fluxing\ agent}) \geq C\left(Al_{molten\ portion\ of\ input\ +fluxing\ agent}\right)$$

at melting T of coal byproduct

C is the concentration of aluminum

FIG. 4

Step 3: The coal byproduct (input) from step 1 is heated in air for a period of time (3 minutes or longer) at a temperature above the liquid starting temperature of the coal byproduct (input) from step 1.

Step 4: The molten coal byproduct (input) or slag from step 3 is cooled at a rate slower than the critical glass transition cooling rate of the melt to form REE monazite (product).

Step 5 After REE phosphate (product) formed, the molten coal byproduct (input) or slag is heated above a temperature given in condition 3.

Step 6: The coal byproduct (input) is cooled preferentially at a rate faster than the critical glass transition cooling rate of the melt to minimize unwanted solid formation.

Step 7: REE monazite is separated from slag using conventional separation techniques (magnetic, gravity, etc.).

If simply heated at 1500 °C in air
[Synthetic coal byproduct mixed with 18 wt.% AlPO$_4$] + Ho$_2$O$_3$, La$_2$O$_3$, Sm$_2$O$_3$ (3 wt.% each)

No monazite...!
But if the invention process is used... (next slide)

{Synthetic coal byproduct mixed with 18 wt.% AlPO$_4$} + Ho$_2$O$_3$, La$_2$O$_3$, Sm$_2$O$_3$ (3 wt.% each)

REE monazite forms! (Ho, La, Sm)PO$_4$

SYSTEM AND METHOD FOR CONCENTRATING RARE EARTH ELEMENTS FROM COAL BYPRODUCTS/SLAG

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments relates to generating compounds with rare earth elements (REEs). More specifically, embodiments relate to a system, method and process that generates compounds where REE from coal byproducts (waste), such as ash and slag, are concentrated in order to facilitate REE extraction by other known processes.

BACKGROUND

In the U.S., rare earth elements (REEs) are used in a number of applications, including advanced technology products. A lack of sufficient domestic supply, however, has forced the United States to rely on foreign sources. Developing domestic sources of REEs is important to promote national security and independence, which has been well documented.

Coal is widely used in industries such as power plants, gasification, and iron & steelmaking. It contains small quantities of REEs at parts per million (ppm) levels. After coal has been used in an industrial process, REE levels are typically increased by approximately one order of magnitude as they partition to coal byproducts in the ash (or slag if the system is hot enough to melt the ash), typically ranging in total concentration between 200-400 ppm, although in some geographic locations for a coal, REE levels can reach 8,000 or higher (See Hower, J., et al., International Journal of Coal Geology, 39 (1999) 141-153 and Hower, J., et al., Coal Combustion and Gasification Products, 5 (2013) 39-47 each of which is incorporated herein by reference). Challenges to extract REEs from a coal byproduct exist partly due to the fact that coal byproduct REEs are present in various mineral forms with different properties. REEs may exist chemically as oxides, be dissolved in mineral phases, or be present in the vitrified slag phase. The low concentrations and various forms of REEs make traditional leaching extraction processes more complex and less economical as more types and quantities of acids and beneficiation stages are required to recover REEs. The present invention addresses REE recovery challenges by melting the coal ash byproduct so all the REEs are in a single form (liquid), then concentrating them into a REE enriched solid phase to facilitate extraction of REEs.

Naturally occurring REE phosphate (monazite for example), one of the predominant mineral sources of REEs, is known to exist below earth's surface in limited areas. Geologists report the formation of natural monazite requires extremely high pressures up to 8,000 atm (about 117,600 psi) and elevated temperatures depending on the chemistry of the melt and the cooling/heating conditions that REEs are subject to.

It is not known how to manufacture REE rich monazite synthetically from coal byproducts in a molten state (extremely high temperatures). This is specifically true using a low pressure procedure (under atmospheric pressure of 1 atm (14.7 psi)). In order to develop an effective and economical REE concentration method without use of high pressures, a unique process was developed.

One or more embodiments include achieving high concentration of REEs based on simple temperature manipulations in atmospheric air. One or more embodiments is practiced at atmospheric pressure, different from naturally occurring REE phosphate formation (a main source for REEs) requiring extremely high pressures.

These and other objects, aspects, and advantages of the present disclosure will become better understood with reference to the accompanying description and claims.

SUMMARY

Embodiments relate to a method for concentrating rare earth elements (REEs) from coal byproduct (such as ash and slag) to facilitate extraction processes. High concentration of REEs are achieved by partitioning these elements into a targeted solid phosphate compound through temperature/time manipulations. Using this method, 0.1 wt. % (1,000 ppm) REEs in a coal byproduct, for instance, can theoretically be concentrated to 59 wt. % REEs in the REE phosphate by supersaturation of the melt with phosphorus from a non-REE phosphate compound such as aluminum phosphate.

One or more embodiments enable extraction of REEs from coal byproduct originating from metallurgical plants, power plants, and gasification plants. However, additional embodiments may include extraction of REEs from urban waste and other sources. These embodiments achieve high concentration of REEs based on simple temperature manipulations in atmospheric air.

The process is practiced at atmospheric pressure, different from naturally occurring REE phosphate formation (a main source for REEs) requiring extremely high pressures. Heating is one important energy requirement of various embodiments, the process is more economical compared to traditional leaching techniques that require large quantities of acidic and basic solutions and the drying of materials at a number of process stages. A reduced health risk as a process compared to current leaching beneficiation REE recovery processes. Economical extraction of REEs would complement existing power plants, gasification plants, iron & steelmaking plants, and other coal-feeding industries by extracting value from process wastes. The successful implementation of the REE recovery process would help reduce the critical and strategic nature of many REEs in the United States by providing a domestic source of materials. Instead of mixing aluminum phosphate (as an additive) with coal byproduct priorto melting, in one exemplary embodiment, aluminum phosphate may be introduced underneath the coal byproduct to maximize the reaction contact.

One or more embodiments relate to a method for concentrating REEs from a coal byproduct. The method includes: mixing the coal byproduct input with an aluminum phosphateadditive; heating the coal byproduct input in air for a period of 3 minutes or longer at a temperature above a liquid starting temperature of the coal byproduct input forming a molten coal byproduct; cooling the molten coal byproduct at a rate slower than critical glass transition cooling rate of the melt, forming REE phosphate product; heating the coal byproduct input above the liquid starting temperature of the coal byproduct after REE phosphate product is formed; and cooling the coal byproduct input at a rate faster than the critical glass transition cooling rate of the melt, minimizing forming unwanted solids. While controlled cooling is described, other separation techniques such as injecting air to sweep solid particles out, filtration, controlled cooling to create large single crystals, the injection of a getter, and the like.

The novel process and principles of operation are further discussed in the following description.

BRIEF DESCRIPTION OF THE DRAWINGS

FIG. 4 illustrates a schematic representation of the conditions that the aluminum phosphate additive must satisfy in accordance with one embodiment;

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide It is not fully understood how to manufacture REE rich monazite naturally or synthetically from coal byproducts in a molten state (extremely high temperatures). This is specifically true using a low pressure procedure (under atmospheric pressure of 1 atm (14.7 psi)). In order to develop an effective and economical REE concentration method without use of high pressures, a unique process was developed in accordance with one embodiment.

Figure 1:
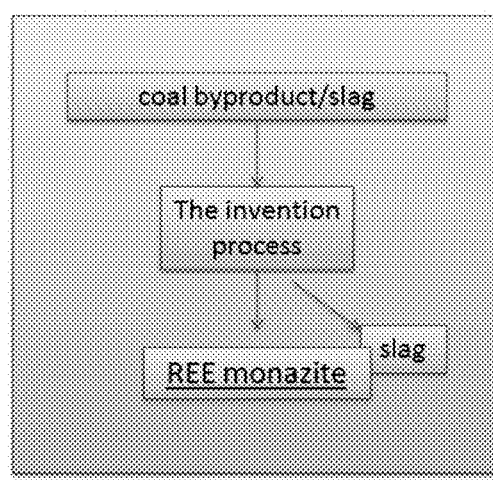
FIG. 1 illustrates a schematic representation of a process of concentrating REEs in a material from a slag in accordance with one embodiment of the present invention.
Figure 2:
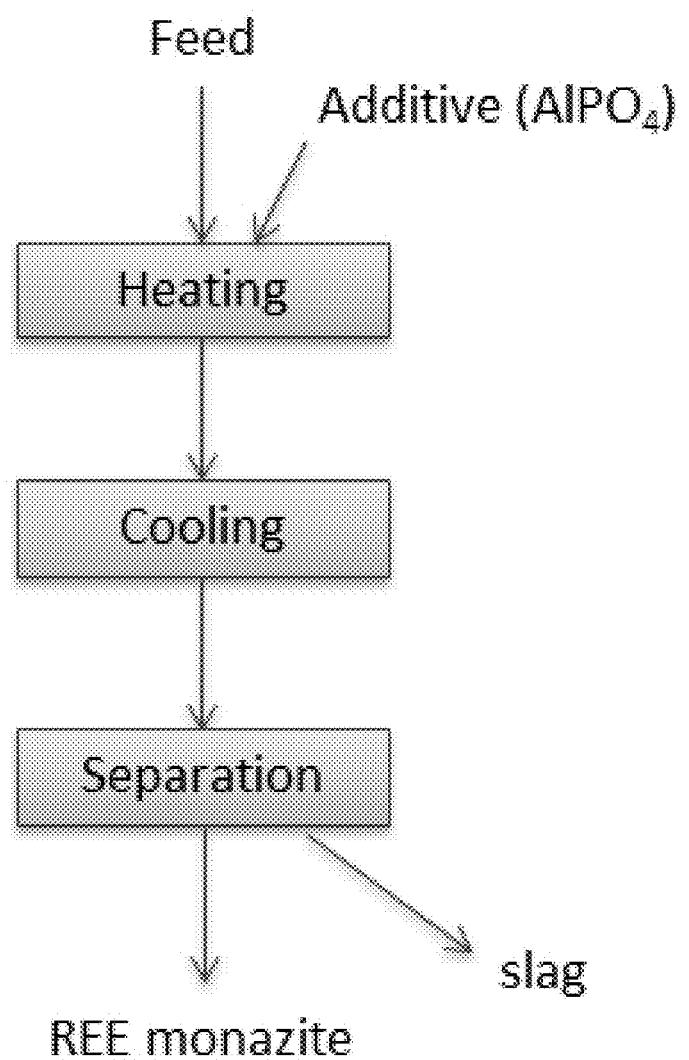
FIG. 2 illustrates a high level flowchart of a method of separating REEs in accordance with one embodiment of the present invention.
Figure 3:
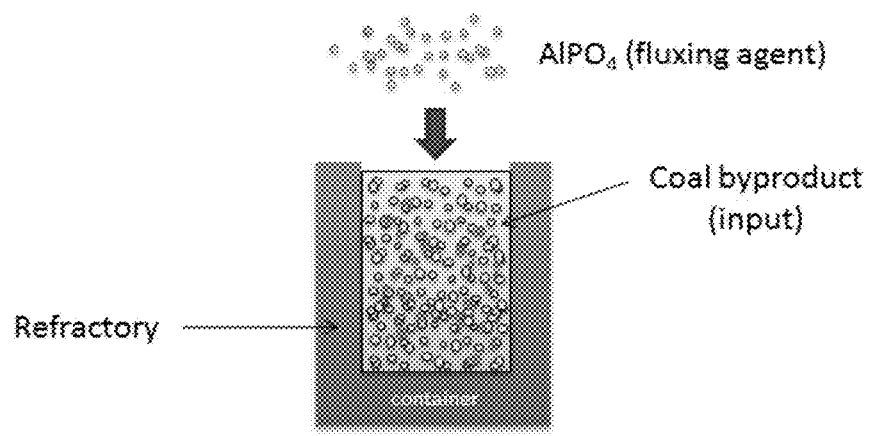
FIG. 3 illustrates a schematic representation of the coal byproduct being mixed with an aluminum phosphate additive in accordance with one embodiment.
Figure 5:
FIG. 5 illustrates a schematic representation of the coal byproduct being heated in air for a period of time in accordance with one embodiment.
Figure 6:
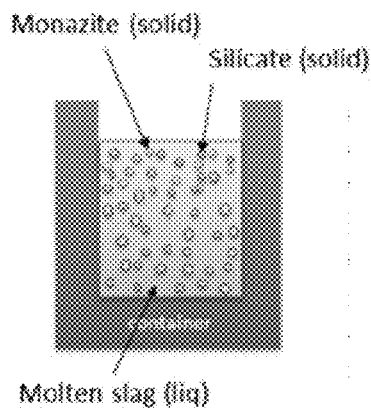
FIG. 6 illustrates a schematic representation of the molten coal byproduct being cooled in accordance with one embodiment.
Figure 7:
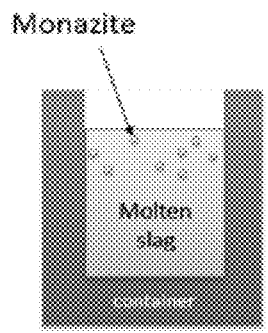
FIG. 7 illustrates a schematic representation of forming the REE phosphate and heating the molten coal byproduct or slag in accordance with one embodiment.
Figure 8:
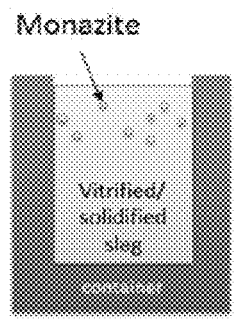
FIG. 8 illustrates a schematic representation of cooling the coal byproduct being mixed with an aluminum phosphate additive in accordance with one embodiment.
Figure 9:
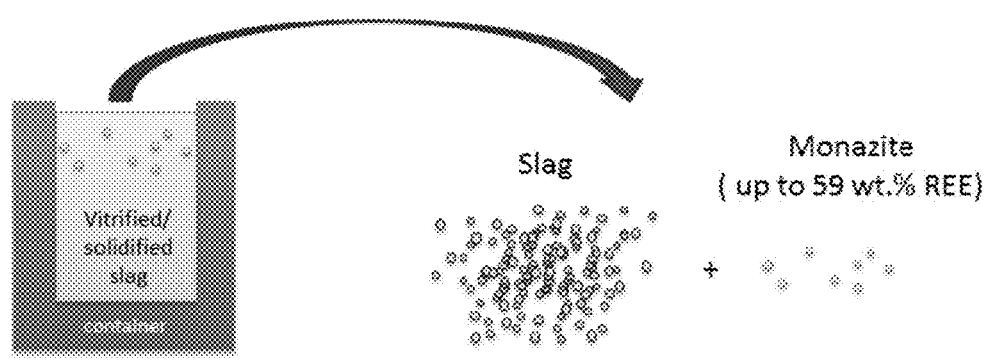
FIG. 9 illustrates a schematic representation of separating REE from slag using conventional separation techniques.

Embodiments relate to a method for concentrating rare earth elements (REEs) from coal byproduct (such as ash and slag) to facilitate extraction processes. High concentration of REEs are achieved by partitioning these elements into a targeted solid phosphate compound through temperature/time manipulations (See FIGS. 1-2 for example). Using this method, 0.1 wt. % (1,000 ppm) REEs in a coal byproduct, for instance, can theoretically be concentrated to 59 wt. % REEs by supersaturation of the liquid melt with phosphorous from a phosphate compound, followed by separation of such concentrates.

In at least one embodiment, a coal byproduct, such as combustion ash from a power plant for example, is mixed with aluminum phosphate in air and heated at elevated temperatures until molten. Then, the melt is slowly cooled at a controlled rate. The controlled cooling forces REE phosphate phases to precipitate as solids from the melt. During this stage, essentially all or almost all REEs are concentrated into a solid phosphate compound—a form that can be separated by traditional methods. Additional concentration of the REE phosphate phase is enhanced by the formation and growth of aluminosilicate (such as mullite) as a solid in the melt. The aluminosilicate phase rejects REEs into the remaining melt, a process that further concentrates REEs in the melt by approximately 3.5 times as compared to that in the melt without the aluminosilicate, promoting the supersaturation of the melt with phosphorous and thus the formation of the REE phosphate (See FIGS. 3-9 for example). Here, the aluminosilicate may be replaced or supplemented by the formation of other phases such as hematite and calcium silicates.

Figure 10A:
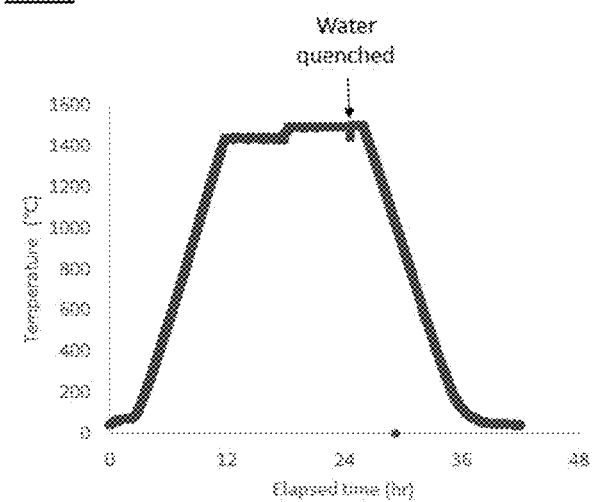
FIGS. 10A-10B illustrates a graph and image illustrating no monazite formed in a synthetic coal byproduct using a conventional method.
Figure 10B:
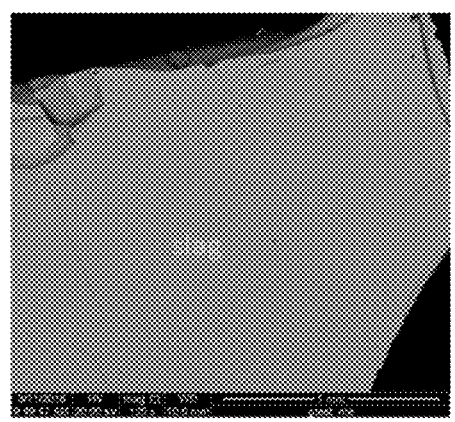
Figure 11A:
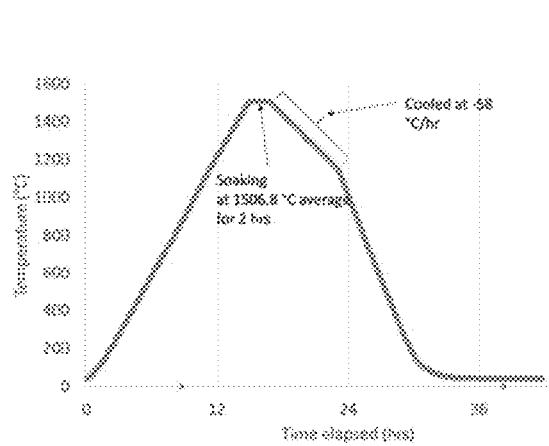
FIGS. 11A-11B illustrates a graph and image illustrating the REE monazite formation in a synthetic coal byproduct using the present controlled cooling method.
Figure 11B:
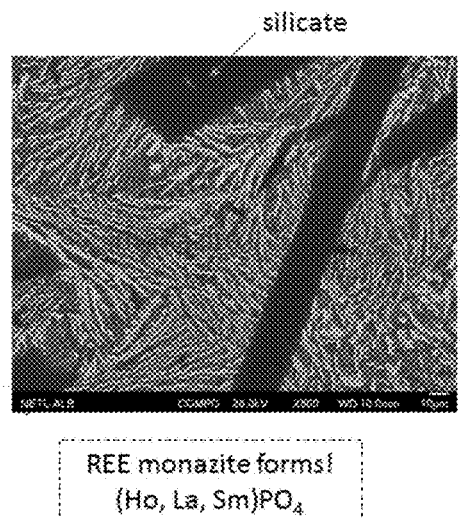
Figure 12:
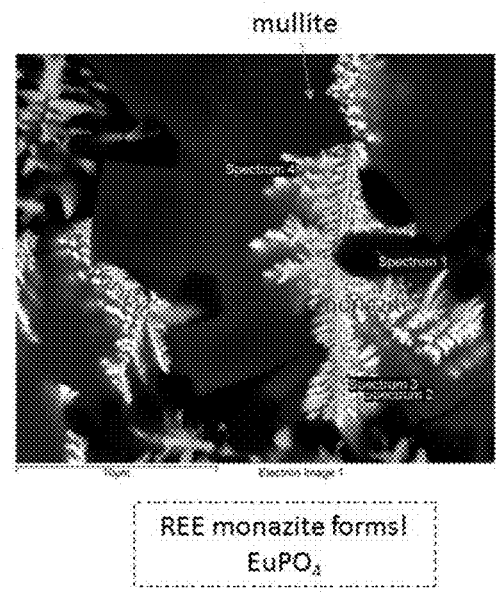
FIG. 12 illustrates REE monazite forms in a synthetic coal ash at 1,000 ppm REE oxides by the present controlled cooling method.
Figures 13A, 13B, 13C, 13D:
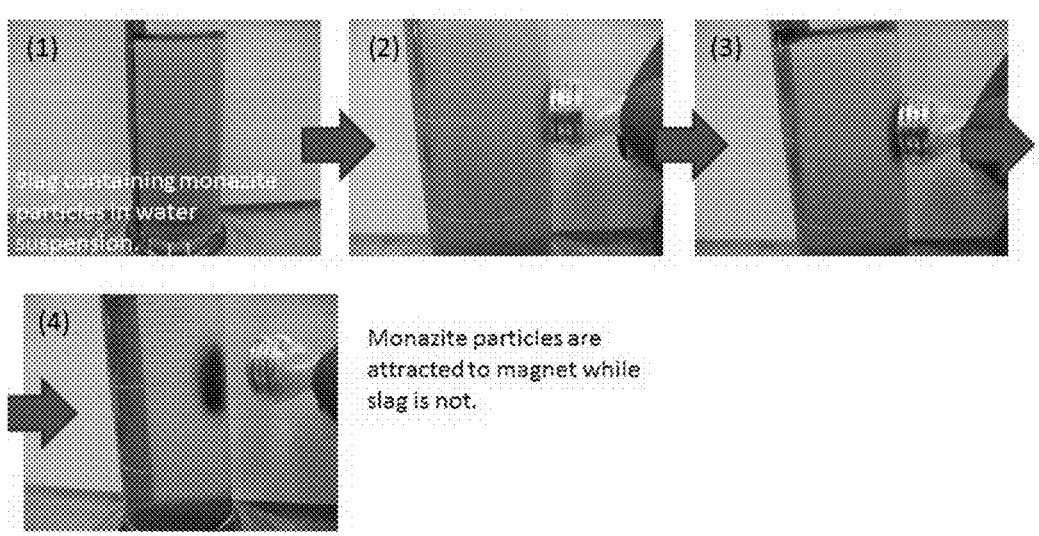
FIGS. 13A-13D demonstrate that monazite particles in a ground slag are attracted to a magnetic field when the ground slag (−325 US mesh) falls to the bottom in a liquid. The magnet facilitates separation of particles attracted to the magnet (those with monazite) from slag particles without monazite.

It was proved through experimentation that merely melting and cooling coal byproduct in a traditional method would not facilitate the formation of REE phosphate (monazite) in coal byproduct (FIGS. 10A-10B). The formation of REE phosphate (i.e., concentration of REEs) is only possible when the following steps and conditions are satisfied as presented in FIGS. 11A-11B (Coal byproduct is defined as coal ash and slag hereafter).

One embodiment comprises one or more of the following steps:
1. Coal byproduct (input) is mixed with aluminum phosphate (additive) see FIG. 3;
2. The aluminum phosphate (additive) addition in step 1 must satisfy Equations 1 and/or 2 below see FIG. 4;
3. The coal byproduct (input) from step 1 is heated in air for a period of time (3 minutes or longer dependent on the starting temperature) at a temperature above the liquid starting temperature of the coal byproduct (input) from step 1 see FIG. 5;
4. The molten coal byproduct (input) from step 3 is next cooled at a rate slower than the critical glass transition cooling rate of the melt to form REE phosphate (product) see FIG. 6;
5. Optionally, after REE phosphate (product) formed, the coal byproduct (input) may be heated above a temperature given in condition 3 see FIG. 7;
6. The coal byproduct (input) after step 5 is cooled at a rate faster than the critical glass transition cooling rate of the melt to minimize the formation of unwanted solids other than the REE phosphate see FIG. 8. While controlled cooling is described, other separation techniques such as injecting air to sweep solid particles out, filtration, controlled cooling to create large single crystals, the injection of a getter, and the like.

In at least one embodiment, one or more of the following conditions must be met:
1. The sum of the number of moles of phosphorous in aluminum phosphate (additive) and that in coal byproduct (input) is equal to or greater than the number of moles of REEs in REE phosphate (product):

$$N(P_{additive}) + N(P_{input}) \geq N(REE_{product}) \qquad \text{Equation 1}$$

where N is the number of moles of phosphorous (P); and
2. The concentration of aluminum in coal byproduct (input) mixed with aluminum phosphate (additive) is equal to or larger than the aluminum concentration in the molten portion of the coal byproduct (input) and aluminum phosphate (additive) at a melting temperature of the coal byproduct (input) fluxed with aluminum phosphate (additive):

$$C(Al_{input+additive}) \geq C(Al_{molten\ portion\ of\ input+additive}) @T_{melting} \qquad \text{Equation 2}$$

where C is the concentration of aluminum.
3. The temperature in step 5 is the temperature at or above which crystals such as mullite and hematite that formed dissociate and/or are dissolved in the melted coal byproduct (input). Above 1000° C. for coal byproducts (input) mixed with aluminum phosphate (additive).

Note a liquid starting temperature above (called the solidus) is the temperature where a solid substance first starts to partially melt upon heating (typically above 1000° C. for a coal byproduct). A critical glass transition cooling rate is the cooling rate where the molten coal byproduct glassifies or vitrifies without forming crystalline materials if cooled at or above this rate (this cooling rate is typically <500° C./sec). Liquid starting temperatures and critical glass transition cooling rates are characteristics of individual coal byproducts, varying with changes in coal chemistry.

In one or more embodiments, aluminum phosphate may be used to facilitate the concentration process, instead of chloric and sulfuric acids used in conventional leaching processes. The REE concentration may be enhanced by forming REE-poor silicate crystals that reject REEs, causing an increase in the concentration of REEs in the melt for the REE phosphate formation. Other REE rejecting solids (or liquids) such as hematite may be used in addition to or instead of silicate to enhance the concentration process.

Any compounds such as chloride and sulfide, which form a phase with REEs, may replace or co-used with phosphate as an additive.

Additional additives such as lime and alkali carbonate/oxide may be introduced to facilitate the concentration process by promoting fluidity of the melt.

Control of the oxygen partial pressure in the process could be used to promote REE concentration in addition to or instead of temperature manipulations.

Other formation supplemental or additional techniques include but not limited to bubbling, slow cooling mimicking single crystal growth, introduction of a solid that REE compounds formed are attracted to, gravity separation that concentrate REE compounds formed in the melt to a particular side.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. For example, while controlled cooling is described, other separation techniques such as injecting air to sweep solid particles out, bubbling, filtration, slow directional cooling to create large single crystals, a solid that the REE phosphates might attach to, gravity separation to the liquid bottom, skimming in a slag, introducing that might drop out, the injection of a getter, and the like. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:
1. A method for concentrating rare earth elements (REEs) from a coal byproduct, comprising:
   mixing the coal byproduct with aluminum phosphate alone or in combination with sulfur used as an additives, forming coal byproduct with additive(s);
   heating the coal byproduct with additive(s) in air for a period of at least 3 minutes at a temperature above a liquid starting temperature of the coal byproduct, forming a molten coal byproduct;
   cooling the molten coal byproduct at a rate slower than critical glass transition cooling rate of molten coal byproduct with additive(s), forming REE product;
   heating the molten coal byproduct with additive(s) above the liquid starting temperature of the coal byproduct after REE product is formed; and
   cooling the coal byproduct with additives at a rate faster than the critical glass transition cooling rate of the molten coal byproduct.
2. The method of claim 1 wherein the sum of the number of moles of phosphorous in the aluminum phosphate additive $N(P_{additive})$ plus the number of moles of phosphorus in the coal byproduct input $N(P_{input})$ is greater than or equal to the number of moles of phosphorous in the REE product $N(REE_{product})$ such that $N(P_{additive}) + N(P_{input}) \geq N(REE_{product})$.
3. The method of claim 1 wherein the concentration of aluminum of the of the coal byproduct plus the concentration of aluminum of the aluminum phosphate additive $C(Al_{input+additive})$ is greater or equal to the concentration of aluminum of the molten portion of the coal byproduct plus the concentration of aluminum of the aluminum phosphate additive $C(Al_{molten\ portion\ of\ input+additive})$ at the melting temperature of the coal byproduct such that $C(Al_{input+additive}) > C(Al_{molten\ portion\ of\ input+additive})$ at melting temperature of the coal byproduct.
4. The method of claim 1 wherein mixing the coal byproduct with the additive causes saturation of crystalline phases in a molten phase at high temperatures.
5. The method of claim 1 wherein heating the coal byproduct above the liquid state starting temperature of the coal byproduct dissolves unwanted solids other than a REE monazite.
6. The method of claim 1 wherein cooling the coal byproduct at a rate faster that than the critical glass transition cooling rate of the melt minimizes forming unwanted solid other than a REE monazite.

7. A method for concentrating rare earth elements (REEs) from a coal byproduct, comprising:
   mixing the coal byproduct with aluminum phosphate alone or in combination with sulfur used as an additive and causing the formation of crystalline phases in a molten phase at high temperature, forming coal byproduct with additive(s);
   heating the coal byproduct with additives in air for a period of at least 3 minutes at a temperature above a liquid starting temperature of the coal byproduct with additives, forming a molten coal byproduct;
   cooling the molten coal byproduct at a rate slower than critical glass transition cooling rate of the molten coal byproduct, forming REE product;
   optionally heating the coal byproduct with additives above the liquid starting temperature of the molten coal byproduct after REE phosphate product is formed; and
   cooling the molten coal byproduct with additives at a rate faster than the critical glass transition cooling rate of the molten coal byproduct.

8. The method of claim 7 wherein the sum of the number of moles of phosphorous in the aluminum phosphate additive $N(P_{additive})$ plus the number of moles of phosphorus in the coal byproduct $N(P_{input})$ is greater than or equal to the number of moles of phosphorous in the REE phosphate product $N(REE_{product})$ such that $N(P_{additive})+N(P_{input}) \; N(REE_{product})$.

9. The method of claim 7 wherein the concentration of aluminum of the of the coal byproduct plus the concentration of aluminum of the aluminum phosphate additive $C(Al_{input+additive})$ is greater or equal to the concentration of aluminum of the molten portion of the coal byproduct plus the concentration of aluminum of the aluminum phosphate additive $C(Al_{molten\;portion\;of\;input+additive})$ at the melting temperature of the coal byproduct such that $C(Al_{input+additive}) > C(Al_{molten\;portion\;of\;input+additive})$ at melting temperature of the coal byproduct input.

10. A method for concentrating rare earth elements (REEs) from a coal byproduct, comprising:
   mixing the coal byproduct with aluminum phosphate alone or in combination with an additive selected from the group consisting of sulfide and chloride, forming coal byproduct with additives;
   heating the coal byproduct with additives in air for a period of at least 3 minutes at a temperature above a liquid starting temperature of the coal byproduct, forming a molten coal byproduct;
   cooling the molten coal byproduct at a rate slower than critical glass transition cooling rate of a molten coal byproduct with additives, forming REE product;
   heating the molten coal byproduct with additives above the liquid starting temperature of the coal byproduct after REE product is formed; and
   cooling the molten coal byproduct with additives at a rate faster than the critical glass transition cooling rate of the molten coal byproduct.

* * * * *